(12) United States Patent
Sharma

(10) Patent No.: US 9,049,256 B1
(45) Date of Patent: Jun. 2, 2015

(54) FABRIC SWITCHOVER FOR SYSTEMS WITH CONTROL PLANE AND FABRIC PLANE ON SAME BOARD

(75) Inventor: Usha Sharma, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 372 days.

(21) Appl. No.: 13/051,366

(22) Filed: Mar. 18, 2011

(51) Int. Cl.
*H04L 12/26* (2006.01)
*H04L 29/14* (2006.01)
*H04L 12/947* (2013.01)
*G06F 11/16* (2006.01)

(52) U.S. Cl.
CPC ............... *H04L 69/40* (2013.01); *H04L 49/25* (2013.01); *G06F 11/16* (2013.01)

(58) Field of Classification Search
USPC ......................................... 370/216–220, 386
See application file for complete search history.

(56) References Cited

U.S. PATENT DOCUMENTS

2008/0082630 A1\* 4/2008 Molotchko et al. ........... 709/218
2009/0154342 A1\* 6/2009 Oltman et al. ................ 370/220

\* cited by examiner

*Primary Examiner* — Nicholas Sloms
(74) *Attorney, Agent, or Firm* — Harrity & Harrity, LLP

(57) ABSTRACT

A network device includes a first and a second control board, with each control board having a separate control plane and fabric plane. The network device is configured to establish an active control plane on the first control board and an active fabric plane on the second control board. The network device is configured to establish a standby fabric plane on the first control board and a standby control plane on the second control board. The network device is configured to detect a failure on the first control board or the second control board and switch the status of the control plane on the second control board from standby to active, when the failure is on the first control board, and switches the status of the fabric plane on the first control board from standby to active when the failure is on the second control board.

20 Claims, 9 Drawing Sheets

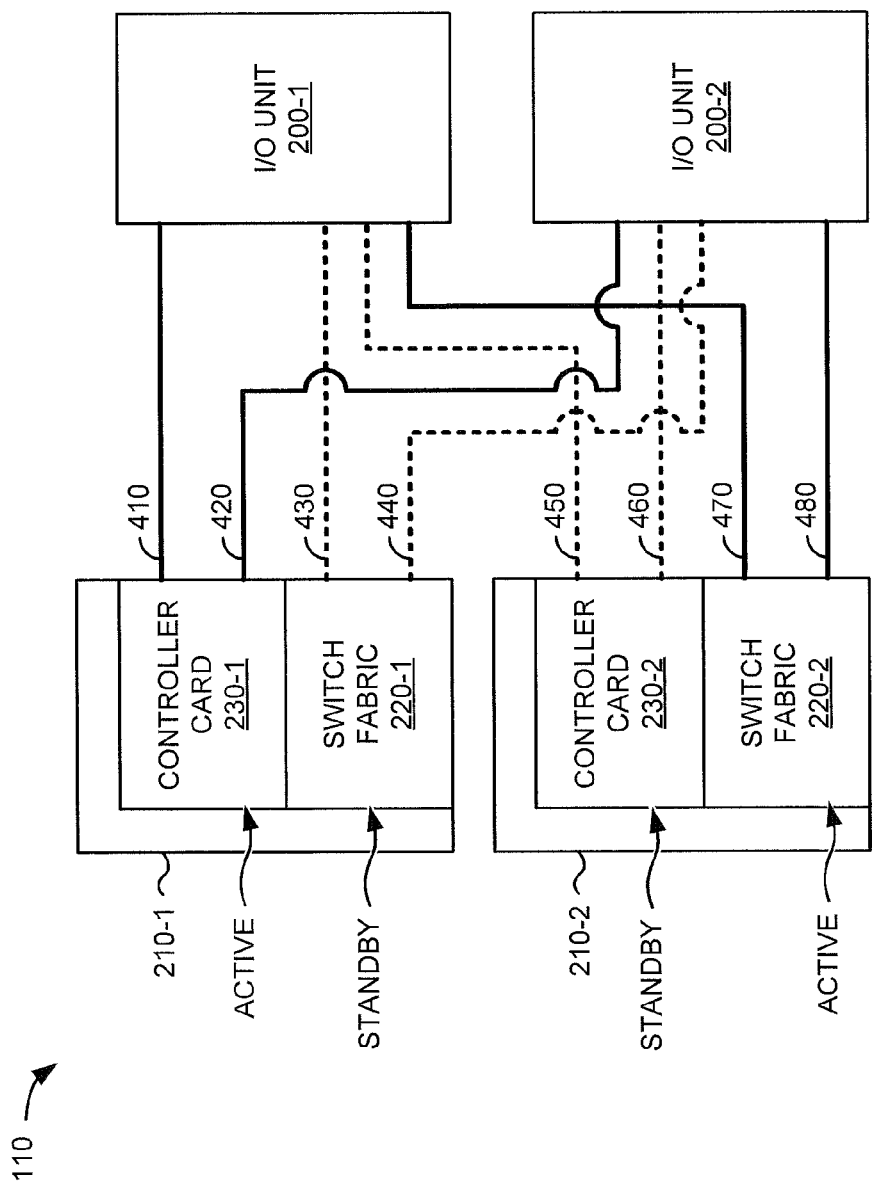

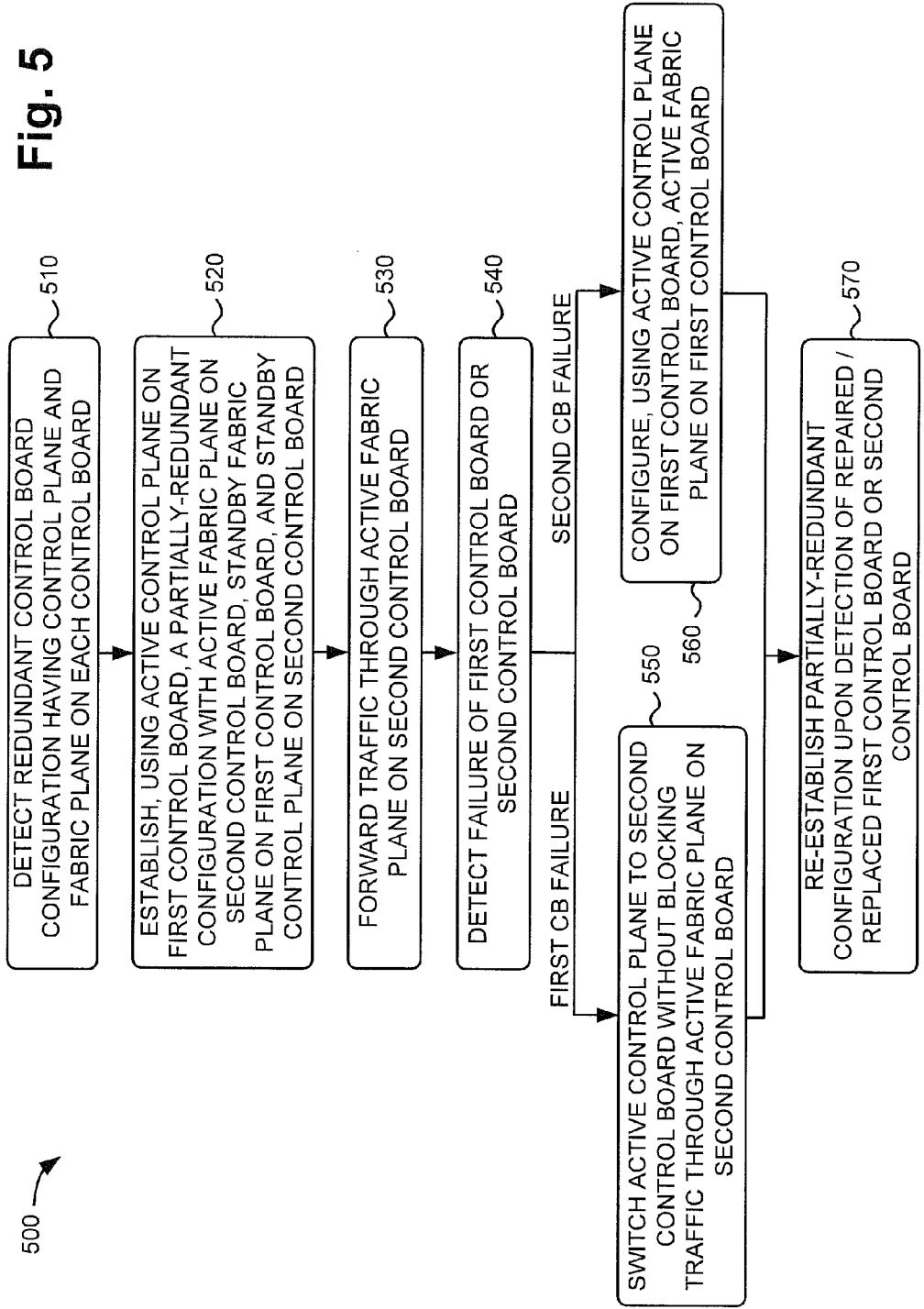

FABRIC SWITCHOVER FOR SYSTEMS WITH CONTROL PLANE AND FABRIC PLANE ON SAME BOARD

BACKGROUND

Networks typically include elements, such as routers, switches, or gateways, which transfer or switch data from one or more sources to one or more destinations. A packet is one format of data in which encapsulated data can be transmitted through a network. A network device may process packets. When the network device receives a packet at an input port, the network device may determine a destination and/or output port for the packet and/or determine whether to drop the packet or send the original packet or a modified packet to another network device through an output port.

Components of the network device may malfunction or go out-of-service. In order to maintain functioning of the network device, the network device may contain a backup component, which may take over when a particular component of the network device malfunctions or goes out-of-service. However, if one of the particular components fails, a transition to a backup component may be complicated and/or time consuming. Furthermore, configurations to assure that the transition incurs minimal interruption to the performance of the network device may tax the resources of the network device.

SUMMARY

In one implementation, a method may be performed by a network device that includes a first control board and a second control board, with each of the first control board and the second control board having a separate control plane and fabric plane. The method may include setting, by the network device, the control plane on the first control board as an active control plane; establishing, by the active control plane on the first control board, the fabric plane on the second control board as an active fabric plane; establishing, by the active control plane on the first control board, the fabric plane on the first control board as a standby fabric plane; and establishing, by the active control plane on the first control board, the control plane on the second control board as a standby control plane. The method may also include detecting, by the network device, a failure on the first control board or the second control board; switching, by the network device, the standby control plane on the second control board from to an active control plane, without switching the active fabric plane on the second control board or the standby fabric plane on the first control board, when the failure is on the first control board; and switching, by the active control plane on the first control board, the standby fabric plane on the first control board to an active fabric plane, without switching the active control plane on the first control board or the standby control plane on the second control board, when the failure is on the second control board In another implementation, a network device may include a first control board having a first control plane and a first fabric plane; a second control board having a second control plane and a second fabric plane; and multiple of input/output units to receive instructions from the first or second control plane and to transmit traffic through the first or second fabric plane. The network device may designate as active the first control plane to communicate with the multiple input/output units, designate as active the second fabric plane to receive traffic from the multiple input/output units, designate as standby the second control plane, and designate as standby the first fabric plane. The network device may identify a failure of the first control board, and switch, based on the identification of the failure, a status of the second control plane from standby to active without blocking traffic between the second control plane and the multiple input/output units.

In a further implementation, a non-transitory computer-readable medium having computer-executable instructions may include one or more instructions to identify, as a master controller for a network device, a first controller card on a first control board, and identify, as an active fabric plane for the network device, a first switch fabric on the first control board. The computer-readable medium may further have instructions to identify a second control board for the network device, the second control board including a second controller card and a second switch fabric; designate, as a standby controller for the network device, the second controller card; designate, as the active fabric plane for the network device, the second switch fabric to receive traffic from a plurality of input/output units; designate, as a standby fabric for the network device, the first switch fabric; and provide instructions to the multiple input/output units to forward traffic through the second switch fabric.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIGS. 4A-4E are diagrams of example interactions among components of an example portion of the network device illustrated in FIG. 2; and FIG. 5 is a flow diagram illustrating an example process for providing fabric switchover for systems with control plane and fabric plane on the same board according to an implementation described herein.

DETAILED DESCRIPTION

The following detailed description refers to the accompanying drawings. The same reference numbers in different drawings may identify the same or similar elements.

Systems and/or methods described herein may provide a mechanism for fabric switchover in systems with a control plane and fabric plane on the same board. A network device (e.g., a router, a switch, etc.) may include a redundant configuration that includes at least two control boards, each with a control plane (or control card) and a fabric plane (or fabric card). A control card may be chosen as a master control card of the network device. A standby (or backup) control card may be designated or elected using an algorithm in the network device. Similarly, a fabric card, on a different board than the master control card, may be chosen as an active fabric card of the network device. A standby fabric card may be designated on the same board as the master control card. Thus, each control board may provide partial redundancy for the network device that minimizes switchover times due to any one control board failure.

Figure 1:
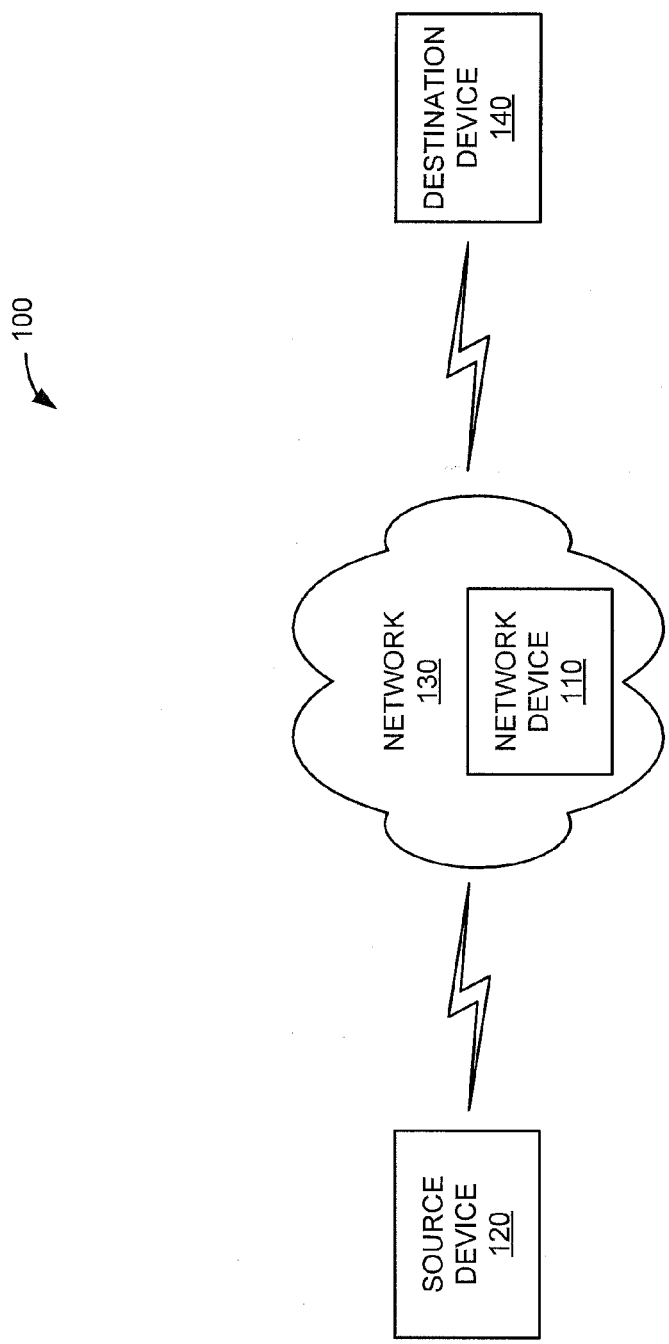
FIG. 1 is a diagram of an example network in which concepts described herein may be implemented.

FIG. 1 is diagram of an example network system 100 in which systems and methods described herein may be implemented. Network 100 may include a network device 110, a source device 120, a network 130, and a destination device 140.

Network device 110 may include any device that receives and transmits traffic (e.g., packets) within a network or between networks. Network device 110 may include, for example, a router, a gateway, a switch, a firewall, a hub, a bridge, a proxy server, an optical add-drop multiplexer (OADM), or some other type of device that processes and/or transfers traffic. Network device 110 may include one or more ingress ports and one or more egress ports. Network device 110 may receive a packet at one of the ingress ports, determine a destination of the received packet, determine an egress port based on the determined destination, and forward the packet via the determined egress port. Additionally, network device 110 may determine whether to forward the received packet or whether to drop the received packet. (The term "packet" as used herein, may refer to a packet, a datagram, a data item, or a cell; a fragment of a packet, a fragment of a datagram, a fragment of a data item, a fragment of a cell; or another type, arrangement, or packaging of data.)

Source device 120 and destination device 140 may include any device that may communicate over network 130. Source device 120 and destination device 140 may be a same type of device or different types of devices. For example, source device 120 and destination device 140 may include a personal computer or workstation, a server device, a portable communication device (e.g. a mobile phone), an access point base station, a cellular base station, or any type of network device encompassed by network device 110.

Network 130 may include a collection of devices and/or links that facilitate the transmission of traffic. For example, network 130 may include one or more of a local area network (LAN), a wide area network (WAN), a metropolitan area network (MAN), a wireless network, such as a general packet radio service (GPRS) network, an ad hoc network, a public switched telephone network (PSTN), a subset of the Internet, any other type of network, or any combination thereof.

Although FIG. 1 shows example devices of network 100, in other implementations, network 100 may include fewer devices, different devices, differently arranged devices, and/or additional devices than those depicted in FIG. 1. Alternatively, or additionally, one or more devices of network 100 may perform one or more other tasks described as being performed by one or more other devices of network 100.

Figure 2:
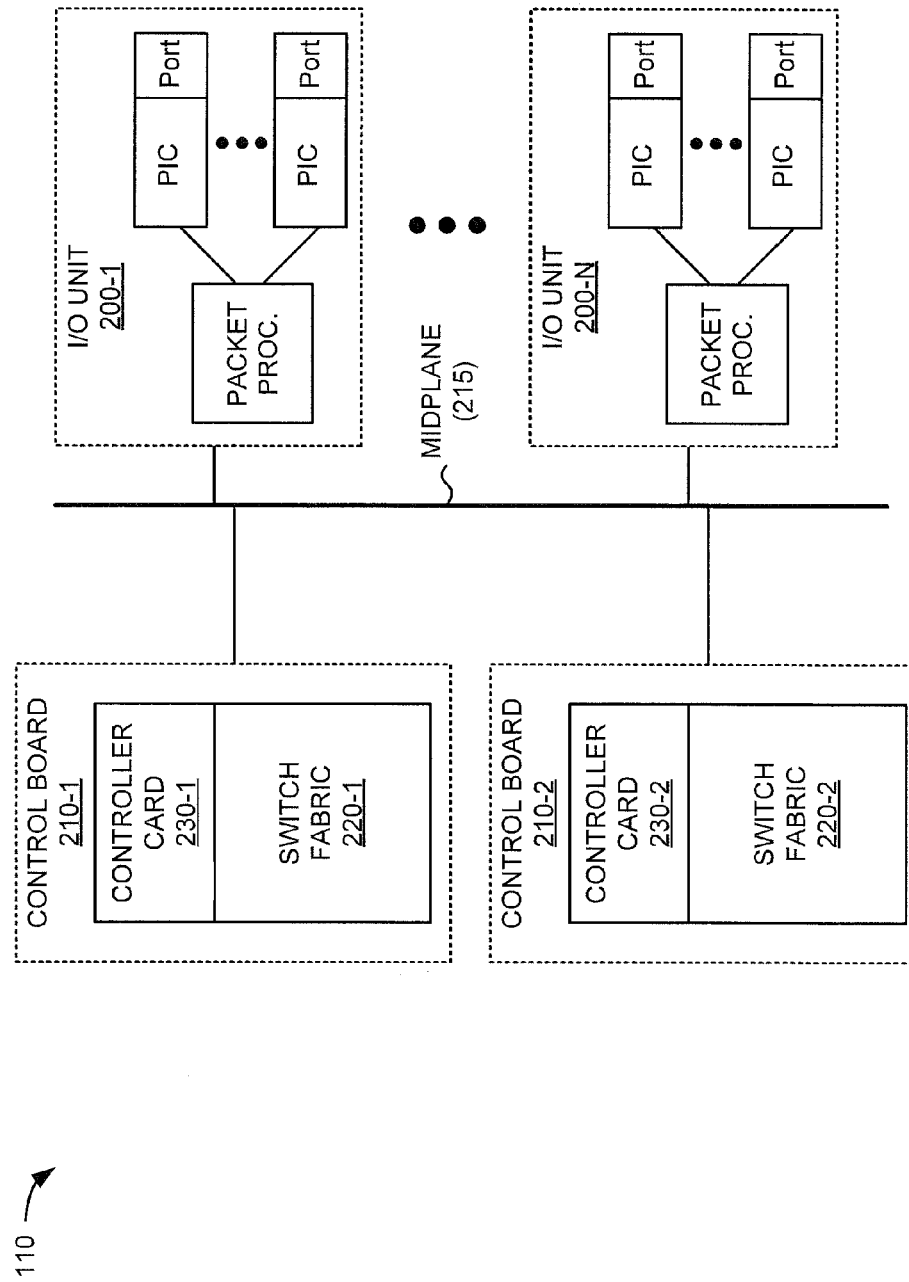
FIG. 2 is a block diagram of an example network device of FIG. 1.

FIG. 2 is a diagram illustrating example components of network device 110 according to an implementation described herein. Network device 110 may include input/output (I/O) units 200-1 through 200-N (referred to collectively as "I/O units 200" and individually as "I/O unit 200") and control boards 210-1 and 210-2 (referred to collectively as "control boards 210" and individually as "control board 210") interconnected using a midplane 215 that may permit connections among the components of network device 110. Each control board 210 may include switch fabric 220-1 or 220-2 (referred to collectively as "switch fabrics 220" and individually as "switch fabric 220") and a controller card 230-1 or 230-2 (referred to collectively as "controller cards 230" and individually as "controller card 230").

I/O units 200 may include a component or collection of components to receive packets, process incoming and/or outgoing packets, transmit outgoing packets, and/or provide a status of the condition of I/O units 200. For example, I/O unit 200 may correspond to a line card, or the like, that includes some processing capabilities and a set of interface ports. In one implementation, I/O unit 200 may include one or more physical interface connectors (PICs) and a packet processor. The PIC may include a collection of ports that connect network 130, via physical links, to the packet processor. The packet processor may include one or more packet processing component(s), switch interface component(s), Internet processor component(s), memory device(s), etc. I/O unit 200 may also include other components (not shown), such as central processing unit (CPU), a memory device, an Ethernet interface, and/or indicators (e.g., light emitting diodes, etc.).

I/O units 200 may perform certain operations on incoming and/or outgoing packets, such as decapsulation, encapsulation, demultiplexing, multiplexing, queuing, etc. operations, that may facilitate the processing and/or transportation of incoming and/or outgoing packets. Operations of I/O units 200 may be managed by an active controller card 230 on one of control boards 210. Based on instructions from controller card 230, I/O units 200 may forward packets to and/or receive packets from other I/O units 200 (e.g., via an active switch fabric 220).

Each control board 210 may include switch fabric 220 and controller card 230 physically located on control board 210 along with other components (not shown). Control board 210-1 and control board 210-2 together may provide physical redundancy of switch fabrics 220 and controller cards 230. In one implementation, only one switch fabric 220 and one controller card 230 may be active at the same time. Controller cards 230-1 and 230-2 may be interchangeably configured as an active (e.g., master) controller card and a standby (e.g., backup) controller card. Similarly, switch fabrics 220-1 and 220-2 may be interchangeably configured as an active switch fabric and a standby (e.g., backup) switch fabric card. Control boards 210 and components within control boards 210 may be interconnected by internal links. For example, control board 210-1 and control board 210-2 may be interconnected via internal links. Additionally, or alternatively, controller card 230-1 and switch fabric 220-1 and controller card 230-2 and switch fabric 220-2 may be interconnected via internal links.

Switch fabric 220 may include one or more switching planes to facilitate communication among I/O units 200 and/or controller cards 230. In one implementation, each of the switching planes may include a single or multi-stage switch of crossbar elements. In another implementation, each of the switching planes may include some other form of switching elements. Switch fabric 220 may also, or alternatively, include processors, memories, and/or paths that permit communication among I/O units 200 and/or controller cards 230.

Controller card 230 may include one or more control planes to make routing decisions and perform high-level management functions for network device 110. For example, controller card 230 may communicate with other networks and systems connected to network device 110 to exchange information regarding network topology. Controller card 230 may create a routing table based on the network topology information, create forwarding table(s) based on the routing table, and may forward the forwarding table(s) to I/O units 200. Controller card 230 may maintain status information of I/O units 200 and control boards 210. For example, controller card 230 may generate status tables that may be used to perform safe removal operations of I/O units 200 and/or control boards 210. Controller card 230 may include processors, microprocessors, or some form of hardware logic (e.g., application specific integrated circuits (ASICs) or field programmable gate arrays (FPGAs)).

When network device 110 becomes operational (e.g., upon powering up), one control board 210 (e.g., control board 210-1), including one controller card 230 (e.g., controller card 230-1) and one switch fabric (e.g., switch fabric 220-1), may initially be designated as active components. The second control board 210 (e.g., control board 210-2), including another controller card 230 (e.g., controller card 230-2) and another switch fabric 220 (e.g., switch fabric 220-2) may initially be designated as standby components. The active controller card 230 (e.g., controller card 230-1) may detect the presence of the second control board 210 (e.g., control board 210-2), the second controller card 230 (e.g., controller card 230-2), and the second switch fabric 220 (e.g., switch fabric 220-2), and may reconfigure switch fabrics 220-1 and 220-2 to include an active switch fabric 220 (e.g., switch fabric 220-2) on a separate control board 210 from active control board 210 (e.g., control board 210-1). In other words, active controller card 230-1 may reconfigure switch fabric 220-1 to be a standby switch fabric and switch fabric 220-2 to be the active switch fabric.

In one implementation, the active controller card 230 (e.g., controller card 230-1) may signal each of I/O units 200 to verify communication links with the second switch fabric 220 (e.g., switch fabric 220-2) and then provide instructions to changeover to the second switch fabric 220 (e.g., switch fabric 220-2) once each I/O unit has verified a respective link. Furthermore, the active controller card 230 (e.g., controller card 230-1) may configure the other switch fabric 220 (e.g., switch fabric 220-1) and the other controller card 230 (e.g., controller card 230-2) as standby components. Thus, network element 110 may be configured with a partially redundant configuration among control boards 210. One control board 210 (e.g., control board 210-1) may include an active controller card 230 (e.g., controller card 230-1) and a standby switch fabric 220 (e.g., switch fabric 220-1), while the other control board 210 (e.g., control board 210-2) may include an active switch fabric 220 (e.g., switch fabric 220-2) and a standby controller card 230 (e.g., controller card 230-2).

Although FIG. 2 shows example components of network device 110, in other implementations, network device 110 may include fewer components, different components, differently arranged components, or additional components than depicted in FIG. 2. Alternatively, or additionally, one or more components of network device 110 may perform one or more other tasks described as being performed by one or more other components of network device 110.

Figure 3:
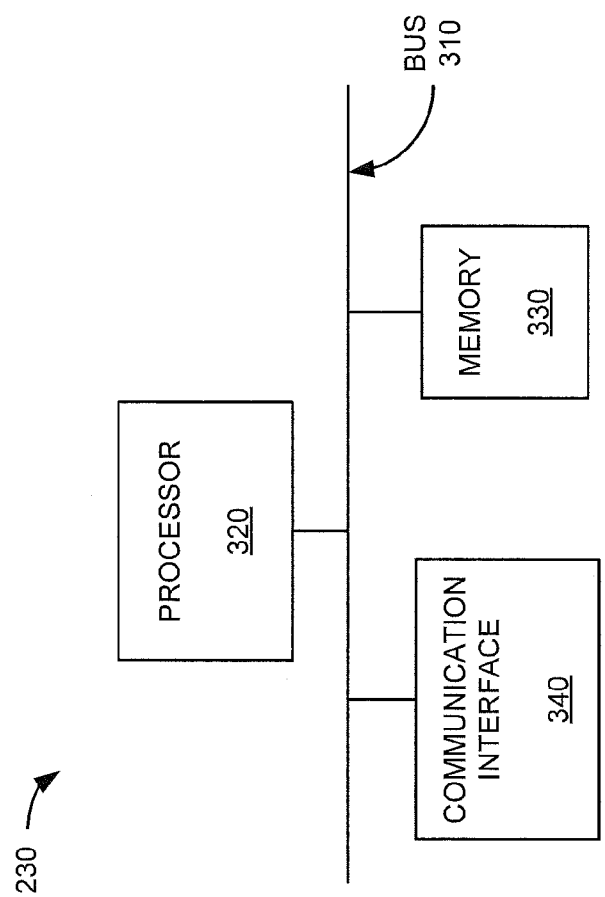
FIG. 3 is a diagram illustrating components of a controller card, a switch fabric, or a line card of the network device depicted in FIG. 2.

FIG. 3 is a diagram illustrating components of controller card 230 of network device 110. As illustrated, control card 230 may include a bus 310, a processor 320, a memory 330, and a communication interface 340. Bus 310 may permit communication among the components of controller card 230.

Processor 320 may include one or more processors, microprocessors, ASICs, FPGAs or the like. Processor 320 may execute software instructions/programs or operate upon data structures to control operation of controller card 230 and its components.

Memory 330 may include a random access memory (RAM) or another type of dynamic storage device that may store information and/or instructions for execution by processor 320; a read only memory (ROM) or another type of static storage device that may store static information and/or instructions for use by processor 320; a flash memory (e.g., an electrically erasable programmable read only memory (EEPROM)) device for storing information and/or instructions; and/or some other type of magnetic or optical recording medium and its corresponding drive. Memory 330 may also be used to store temporary variables or other intermediate information during execution of instructions by processor 320. Instructions used by processor 320 may also, or alternatively, be stored in another type of computer-readable medium accessible by processor 320. A computer-readable medium may be defined as a non-transitory memory device. A memory device may include space within a single physical memory device or spread across multiple physical memory devices.

Communication interface 340 may include any communication mechanism that allows card 300 to communicate with another card or another component of network device 110 or another element across a network. For example, communication interface 340 may include an Ethernet interface.

Although FIG. 3 shows example components of controller card 230, in other embodiments, controller card 230 may include fewer, different, or additional components than depicted in FIG. 3. In still other embodiments, one or more components of controller card 230 may perform the tasks described as being performed by one or more other components of controller card 230.

FIGS. 4A-4E are diagrams of example interactions among certain components of network device 110. As illustrated, the certain components of network device 110 may include I/O unit 200-1, I/O unit 200-2, control board 210-1, control board 210-2, switch fabric 220-1, switch fabric 220-2, controller card 230-1, and controller card 230-2. Although two I/O units 200 are shown for simplicity, more I/O units 200 may be included. I/O unit 200-1, I/O unit 200-2, board 210-1, control board 210-2, switch fabric 220-1, switch fabric 220-2, controller card 230-1, and controller card 230-2 may include the features described above in connection with, for example, FIGS. 2 and 3.

Figure 4A:
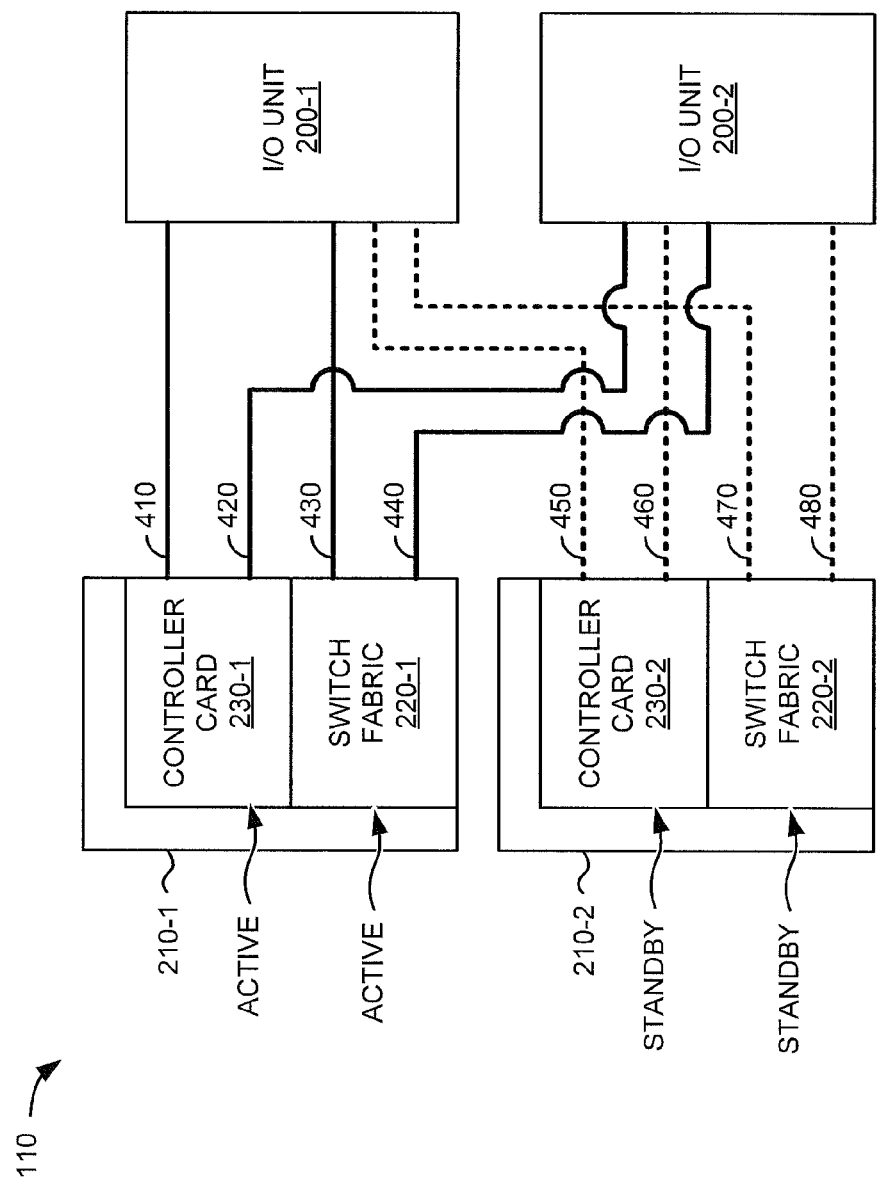

Referring to FIG. 4A, when network device 110 is initially powered-up and/or configured, control boards 210-1 and control boards 210-2 may default to a fully redundant configuration. For example, switch fabric 220-1 and controller card 230-1 may be configured as active components, while switch fabric 220-2 and controller card 230-2 may be configured as backups (e.g., in standby mode). In FIGS. 4A-4E, active connections (or links) with I/O units 200 are shown with solid connector lines, while inactive connections with I/O units 200 are shown with dashed lines. Thus, in the configuration of FIG. 4A, active controller card 210-1 may maintain an active link 410 with I/O unit 200-1 and an active link 420 with I/O unit 200-2, while active switch fabric 220-1 may maintain an active link 430 with I/O unit 200-1 and an active link 440 with I/O unit 200-2. Standby switch fabric 220-2 may have an inactive link 470 with I/O unit 200-1 and an inactive link 480 with I/O unit 200-2, while standby controller card 230-2 may have an inactive link 450 with I/O unit 200-1 and an inactive link 460 with I/O unit 200-2.

In an implementation described herein, once active controller card 230-1 detects that the components of control boards 210-2 are available (e.g., upon an successful power-up or insertion of a control board 210-2), active controller card 230-1 may direct a change of switch fabric 220-1 to standby mode and switch fabric 220-2 to active mode. That is, active controller card 230-1 may initiate a configuration change to switch from a fully redundant configuration to a partially redundant configuration shown in FIG. 4B.

Referring to FIG. 4B, control board 210-1 and control board 210-2 may be configured in a partially redundant configuration, in that an active switch fabric (e.g., switch fabric 220-2) and an active controller card 230 (e.g., controller card 230-1) may be distributed on separate control boards 210. The control board 210 (e.g., control board 210-1) with the active controller card 230 (e.g., controller card 230-1) may be configured with a standby switch fabric 220 (e.g., switch fabric 220-1). The control board 210 (e.g., control board 210-2) with the active switch fabric 220 (e.g., switch fabric 220-2) may be configured with a standby controller card 230 (e.g., controller card 230-2). In one implementation, the active controller card 230 (e.g., controller card 230-1) may be programmed to initiate a switchover from switch fabric 220-1 to switch fabric 220-2 when recognizing that control board 210-2 is on-line. In another implementation, a user may initiate the switchover from switch fabric 220-1 to switch fabric 220-2 via a program command (e.g., a command line interface).

Thus, in the configuration of FIG. 4B, active controller card 210-1 may maintain an active link 410 with I/O unit 200-1 and an active link 420 with I/O unit 200-2, while active switch fabric 220-2 may maintain an active link 470 with I/O unit 200-1 and an active link 480 with I/O unit 200-2. Standby switch fabric 220-1 may have an inactive link 430 with I/O unit 200-1 and an inactive link 440 with I/O unit 200-2, while standby controller card 230-2 may have an inactive link 450 with I/O unit 200-1 and an inactive link 460 with I/O unit 200-2. Once all of the links (e.g., links 470 and 480) between active switch fabric 220-2 and I/O units 200 have been verified (e.g., via a handshake signaling procedure) traffic from I/O units 200 may be forwarded through switch fabric 220-2.

Figure 4C:
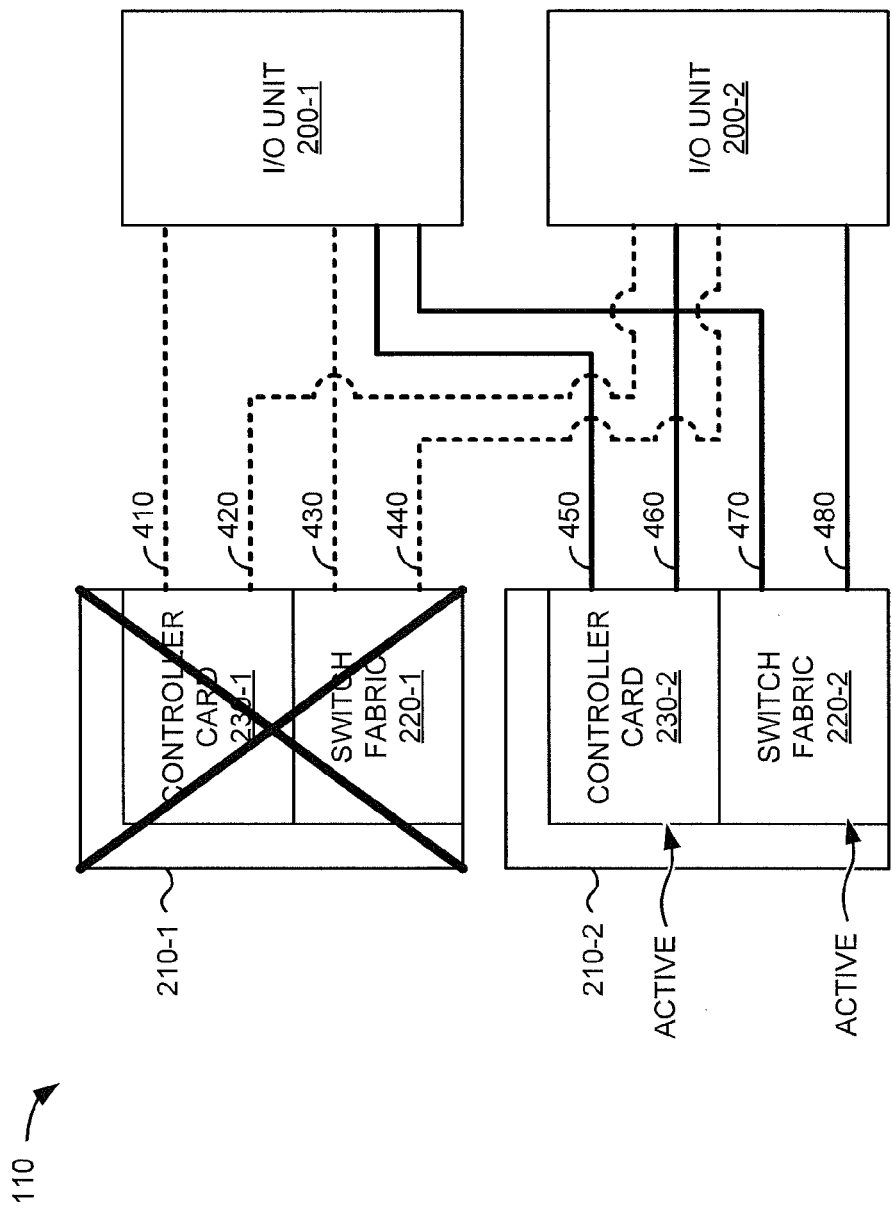

Referring to FIG. 4C, a failure to control board 210-1 (containing active controller card 230-1 and standby switch fabric 220-1) may occur. For example, control board 210-1 may experience a power failure; a user may physically remove control board 210-1 from network device 110 without initiating a shutdown; etc. Failure of control board 210-1 may disable active controller card 230-1, link 410 with I/O unit 200-1, and link 420 with I/O unit 200-2. Standby controller card 230-2 may become aware of the failure of controller card 230-1 and switchover to an active status. For example, switchover by standby controller 230-2 may occur when standby controller 230-2 fails to receive a status message (e.g., a ping, a heartbeat, etc.) from active controller card 230-1, receives an error signal from one of I/O units 200, or receives an error message from switch fabric 220-2. Thus, as shown in FIG. 4C, newly-active controller card 230-2 may maintain active link 450 with I/O unit 200-1 and active link 460 with I/O unit 200-2. The active control plane switchover (e.g., from controller card 230-1 to controller card 230-2) may not affect switch fabric 220-2. Thus, link 470 with I/O unit 200-1 and link 480 with I/O unit 200-2 may remain active, allowing I/O units 200 to continue to process traffic while the control plane switchover occurs.

Figure 4D:
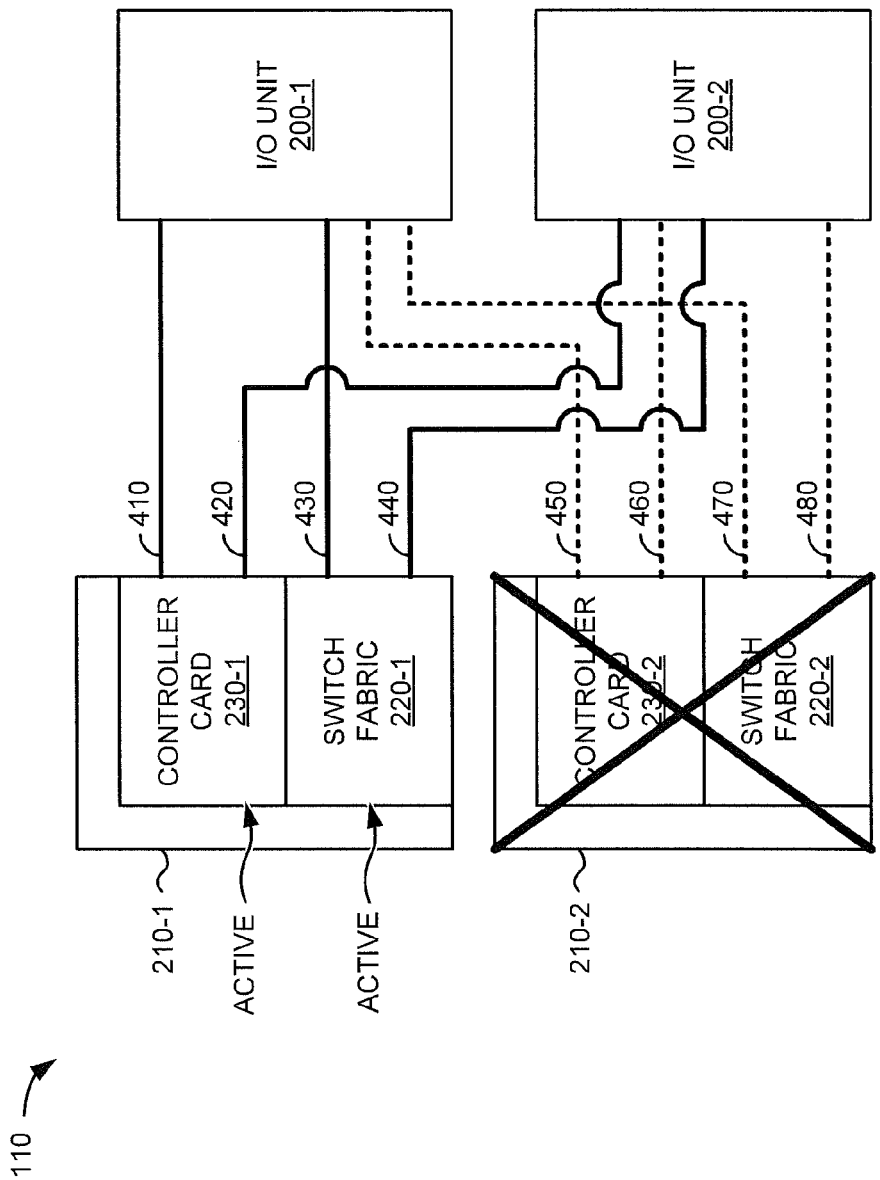

Referring to FIG. 4D, assume that a failure to control board 210-2 (containing standby controller card 230-2 and active switch fabric 220-2) occurs. For example, control board 210-2 may experience a power failure; a user may physically remove control board 210-2 from network device 110 without initiating a shutdown; etc. Failure of control board 210-2 may disable active switch fabric 220-2, active link 470 with I/O unit 200-1, and active link 480 with I/O unit 200-2. However, active controller card 230-1 (e.g., along with active link 410 with I/O unit 200-1, and active link 420 with I/O unit 200-2) may remain operational. Active controller card 230-1 may become aware of the failure of switch fabric 220-2 (e.g., via a message from an I/O unit 200) and initiate a switchover of switch fabric 220-1 to active status. Thus, as shown in FIG. 4D, newly-active switch fabric 220-1 may maintain active link 430 with I/O unit 200-1 and active link 440 with I/O unit 200-2. The active fabric plane switchover (e.g., from switch fabric 220-2 to switch fabric 220-1) may occur more quickly than if a switch of both an active switch fabric 220 and an active controller card 230 occurred simultaneously. For example, because links between active controller card 230-1 and I/O units 200 were not interrupted, controller card 230-1 does not need to verify connections with each I/O unit 200 before initiating a switchover to standby switch fabric 220-1. Thus, link 430 with I/O unit 200-1 and link 440 with I/O unit 200-2 may become active with minimal disruption to traffic flow.

Figure 4E:
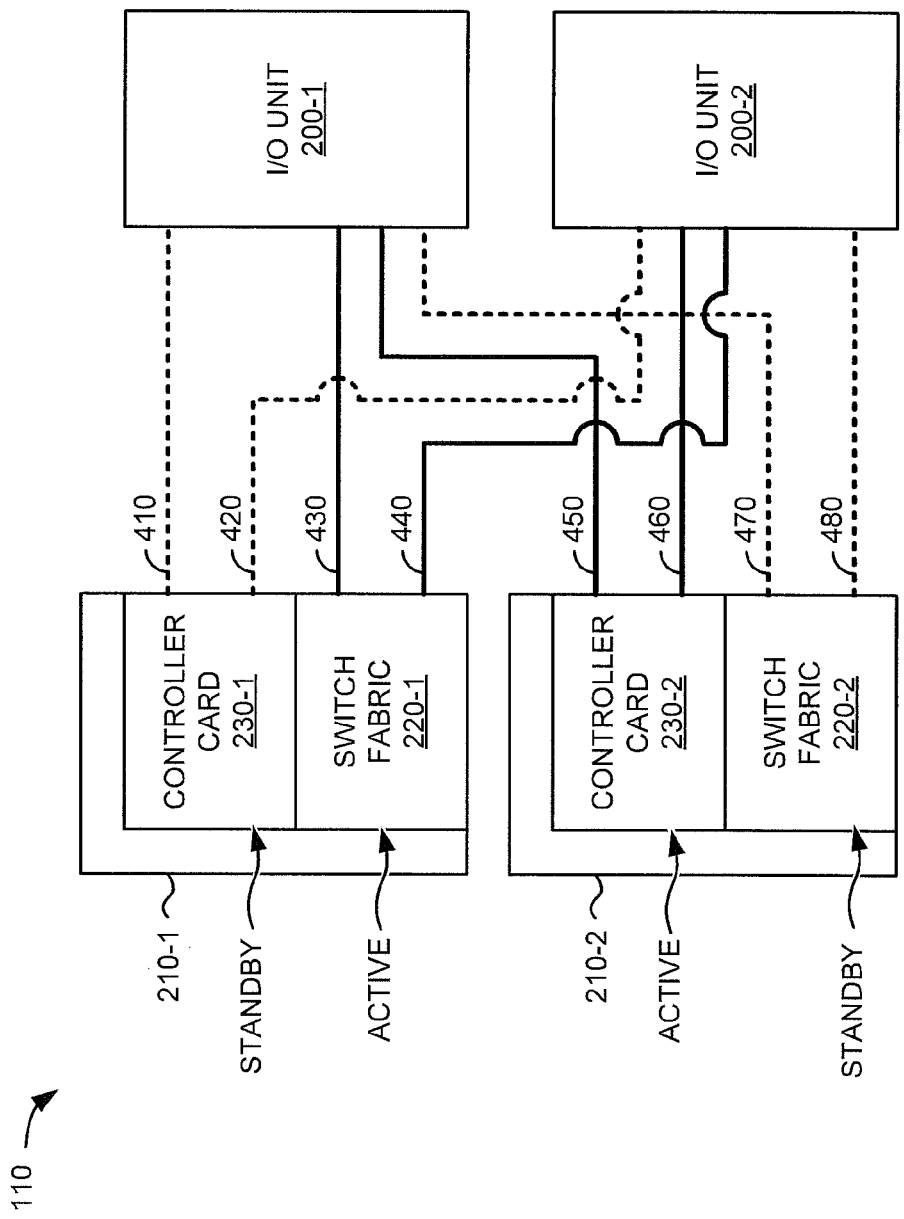

Failure of one of the control boards 210 (e.g., as shown in FIG. 4C or 4D) may be resolved, for example, by returning power to a repaired control board 210 or physically connecting a new (or previously disconnected) control board 210. Initially, the newly connected components (e.g., switch fabric 220 and controller card 230) may be configured as backups (e.g., in standby mode). The active controller card 230 may initiate a return of network device 110 to a partially redundant configuration to ensure an active controller card 230 and an active switch fabric 220 do not remain on the same control board 210. For example, when the failure of control board 210-1, described above in connection with FIG. 4C, is resolved, both switch fabric 220-1 and controller card 230-1 may be in standby mode, while both switch fabric 220-2 and controller card 230-2 may be in active mode. To resolve this configuration, as shown in FIG. 4E, active controller card 230-2 may detect available standby switch fabric 220-1 and automatically initiate a switchover from switch fabric 220-2 to switch fabric 220-1. In another implementation, a user may initiate the switchover from switch fabric 220-2 to switch fabric 220-1 via a program command (e.g., a command line interface).

Although FIGS. 4A-4E shows example interactions of among components of network device 110, in other implementations, network device 110 may include fewer components, different components, differently arranged components, and/or additional components than depicted in FIGS. 4A-4E. Alternatively, or additionally, one or more components of network device 110 may perform one or more other tasks described as being performed by one or more other components of network device 110.

FIG. 5 is a flow diagram illustrating an example process 500 for providing fabric switchover for systems with control plane and fabric plane on the same board according to an implementation described herein. In one implementation, process 500 may be performed by network device 110. In another implementation, process 500 may be performed by another device or group of devices including or excluding network device 110.

Process 500 may include detecting a redundant control board configuration having a control plane and a fabric plane on each control board (block 510). For example, as described above in connection with FIG. 2, when network device 110 becomes operational control board 210-1, including controller card 230-1 and switch fabric 220-1, may initially be designated as active components. Control board 210-2, including another controller card 230-2 and switch fabric 220-2 may initially be designated as standby components.

Process 500 may include establishing, using an active control plane on a first control board, a partially-redundant configuration including an active fabric plane on a second control board, a standby fabric plane on the first control board, and a standby control plane on the second control board (block 520). For example, as described above in connection with FIG. 2, active controller card 230-1 may detect the presence of the control board 210-2, controller card 230-2, and switch fabric 220-2, and may reconfigure switch fabrics 220-1 and 220-2 to include an active switch fabric 220 (e.g., switch fabric 220-2) on a separate control board 210 from active control board 210 (e.g., control board 210-1). Furthermore, controller card 230-1 may configure switch fabric 220-1 and controller card 230-2 as standby components. Thus, network element 110 may be configured with a partially redundant configuration among control boards 210.

Process 500 may further include forwarding traffic through the active fabric plane on the second control board (block 530), and detecting a failure of the first control board or the second control board (block 540). For example, as described above in connection with FIG. 4B, once all of the links (e.g., links 470 and 480) between active switch fabric 220-2 and I/O units 200 have been verified (e.g., trained), traffic from I/O units 200 may be forwarded through switch fabric 220-2. As described above in connection with FIG. 4C, a failure to control board 210-1 (containing active controller card 230-1 and standby switch fabric 220-1) may occur, and standby controller card 230-2 may become aware of the failure of controller card 230-1. Alternatively, as described above in connection with FIG. 4D, a failure to control board 210-2 (containing standby controller card 230-2 and active switch fabric 220-2) may occur, and active controller card 230-1 may become aware of the failure of switch fabric 220-2.

If the failure occurs on the first control board (block 540—FIRST CB FAILURE), process 500 may include switching the active control plane to the second control board without blocking traffic through the active fabric plane on the second control board (block 550). For example, as described above in connection with FIG. 4C, controller card 230-2 may switchover to an active status. Newly-active controller card 230-2 may maintain active link 450 with I/O unit 200-1 and active link 460 with I/O unit 200-2. The active control plane switchover (e.g., from controller card 230-1 to controller card 230-2) may not affect switch fabric 220-2. Thus, link 470 with I/O unit 200-1 and link 480 with I/O unit 200-2 may remain active, allowing I/O units 200 to continue to process and forward traffic while the control plane switchover occurs.

If the failure occurs on the second control board (block 540—SECOND CB FAILURE), process 500 may include configuring, using the active control plane on the first control board, an active fabric plane on the first control board (block 560). For example, as described above in connection with FIG. 4D, active controller card 230-1 may initiate a switchover of switch fabric 220-1 to active status. Newly-active switch fabric 220-1 may use active link 430 with I/O unit 200-1 and active link 440 with I/O unit 200-2. The active fabric plane switchover (e.g., from switch fabric 220-2 to switch fabric 220-1) may occur more quickly than if a switchover of both an active switch fabric 220 and active controller card 230 occurred simultaneously. For example, the controller card 230-1 does not need to verify connections with each I/O unit 200 before initiating a switchover to the standby switch fabric 220-1. Thus, link 430 with I/O unit 200-1 and link 440 with I/O unit 200-2 may become active with minimal disruption to traffic flow.

Returning to FIG. 5, process 500 may include re-establishing a partially redundant configuration upon detection of a repaired and/or replaced first control board or second control board (block 570). For example, as described above in connection with FIG. 4E, failure of one of the control boards 210 (e.g., as shown in FIG. 4C or 4D) may be resolved, for example, by returning power to a repaired control board 210 or physically connecting a new (or previously disconnected) control board 210. Initially, the newly connected components (e.g., switch fabric 220 and controller card 230) may be configured as backups (e.g., in standby mode). The active controller card 230 may initiate a return of network device 110 to a partially redundant configuration to ensure an active controller card 230 and an active switch fabric 220 do not remain on the same control board 210.

Systems and/or methods, described herein, may include a first and a second control board, with each of the first and second control board having a separate control plane and fabric plane. The systems and/or methods may designate a control plane on the first control board and a fabric plane on the second control board as having active status. The systems and/or methods may also designate a fabric plane on the first control board and a control plane on the second control board as having standby status. The systems and/or methods may detect a failure on the first control board or the second control board. The systems and/or methods may switch the status of the control plane on the second control board from standby to active when the failure is on the first control board; and may switch the status of the fabric plane on the first control board from standby to active when the failure is on the second control board.

The systems and/or methods, described herein, may reduce switchover times to backup components of a control board in the event of a power failure or other disruption to one control board. The systems and/or methods further prevent input/output units from encountering inconsistent fabric states as a result of a switchover. In one implementation, the systems and/or methods described herein may provide increased fabric protection with minimal or no software upgrades.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIG. 5, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions, described herein, may be implemented as a component that performs one or more functions. These components may include hardware, such as an ASIC or a FPGA, or a combination of hardware and software.

Even though particular combinations of features are recited in the claims and/or disclosed in the specification, these combinations are not intended to limit disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
setting, by a network device that includes a first control board and a second control board, a first control plane on the first control board to be active,
the first control board further including a first fabric plane, and
the second control board including a second control plane and a second fabric plane;
establishing, by the first control plane, the second fabric plane to be active;
establishing, by the first control plane, the first fabric plane to be in standby;
establishing, by the first control plane, the second control plane to be in standby;
detecting, by the second control plane, a failure of the first control plane while the second control plane is in standby;
switching, by the second control plane and based on the second control plane becoming aware of the failure of the first control plane, the second control plane from being in standby to being active without switching the second fabric plane or the first fabric plane;
determining, by the second control plane, that the first control plane has been restored; and
initiating, by the second control plane and based on determining that the first control plane has been restored, a return of the network device to a partially redundant configuration while the second fabric plane and the second control plane are active,
the network device being in the partially redundant configuration when:
the first fabric plane is active, the second fabric plane is in standby, the first control plane is in standby, and the second control plane is active, or
the first fabric plane is in standby, the second fabric plane is active, the first control plane is active, and the second control plane is in standby.

2. The method of claim 1, further comprising:
detecting a failure of the second control plane; and
forwarding, by the network device, traffic from one or more input/output units through the first fabric plane after detecting the failure of the second control plane.

3. The method of claim 2, further comprising:
detecting, by the network device and after detecting the failure of the second control plane, that the second control board has been restored; and
causing, by the first control plane, the second fabric plane to be active.

4. The method of claim 1, where switching the second control plane from being in standby to being active does not block traffic through the second fabric plane.

5. The method of claim 1, where each of the first control plane, the first fabric plane, the second control plane, and the second fabric plane include separate links to a group of input/output units for sending and receiving traffic.

6. The method of claim 1, further comprising:
detecting, upon powering up of the network device, that the network device is in a redundant control board configuration,
the network device being in the redundant control board configuration when the first control plane and the first fabric plane are active and the second control plane and the second fabric plane are in standby.

7. The method of claim 1,
where only one of the first control plane or the second control plane is active at same time, and
where only one of the first fabric plane or the second fabric plane is active at the same time.

8. The method of claim 1, further comprising:
switching the first fabric plane from being in standby to being active by providing instructions to each of a plurality of input/output units to send traffic over the first fabric plane.

9. The method of claim 1, where switching the second control plane from being in standby to being active includes:
establishing communication between a plurality of input/output units and the second control plane.

10. A network device comprising:
a first control board including a first control plane and a first fabric plane;
a second control board including a second control plane and a second fabric plane; and
a plurality of input/output units to:
receive instructions from the first control plane or the second control plane, and
transmit, based on the received instructions, traffic through the first fabric plane or the second fabric plane,
the network device being to:
designate as active the first control plane to communicate with the plurality of input/output units,
designate as active the second fabric plane to receive traffic from the plurality of input/output units,
designate as standby the second control plane,
designate as standby the first fabric plane,
identify a failure of the first control board, and
switch, based on the failure of the first control board, the second control plane from standby to active while maintaining active links between the second control plane and the plurality of input/output units to continue to allow the plurality of input/output units to process traffic.

11. The network device of claim 10, where the network device is further to:
identify a failure of the second control board, and
switch, based on the failure of the second control board, the first fabric plane from standby to active without affecting communication between the first control plane and the plurality of input/output units.

12. The network device of claim 11, where the network device is further to:
detect, after switching the first fabric plane from standby to active, that the second control board has been restored; and
designate as active the second fabric plane after detecting that the second control board has been restored.

13. The network device of claim 10, where the network device is further to:
detect, after switching the second fabric plane from standby to active, that the first control board has been restored;
designate as active the first fabric plane after detecting that the first control board has been restored; and
switch the second fabric plane from active to standby after detecting that the first control board has been restored.

14. The network device of claim 10, further comprising communication links between the plurality of input/output units and each of the first control plane, the first fabric plane, the second control plane, and the second fabric plane.

15. The network device of claim 10, where the network device includes one of:
a router,
a gateway,
a switch,
a firewall,
a hub,
a bridge,
a proxy server, or
an optical add-drop multiplexer (OADM).

16. The network device of claim 10,
where only one of the first control plane or the second control plane is active at same time, and
where only one of the first fabric plane or the second fabric plane is active at the same time.

17. A non-transitory computer-readable medium comprising storing instructions, the instructions comprising:
one or more instructions that, when executed by at least one processor, cause the at least one processor to:
identify, as a master controller for a network device, a first controller card on a first control board;
identify, as an active fabric plane for the network device, a first switch fabric on the first control board;
identify a second control board for the network device, the second control board including a second controller card and a second switch fabric;
designate, as a standby controller for the network device, the second controller card;
designate, as the active fabric plane for the network device, the second switch fabric to receive traffic from a plurality of input/output units;
designate, as a standby fabric for the network device, the first switch fabric; and
provide instructions to the plurality of input/output units to forward traffic through the second switch fabric, the plurality of input/output units including physical components.

18. The non-transitory computer-readable medium of claim 17, where the instructions further comprise:
one or more instructions that, when executed by the at least one processor, cause the at least one processor to:
identify a failure of the second control board; and
switch, after identifying the failure of the second control board, the first switch fabric from being the standby fabric plane to being the active fabric plane without blocking traffic between the first controller card and the plurality of input/output units.

19. The non-transitory computer-readable medium of claim 18, where the one or more instructions to switch the first switch fabric from being the standby fabric plane to being the active fabric plane includes:
one or more instructions that, when executed by the at least one processor, cause the at least one processor to:
provide instructions to the plurality of input/output units to forward traffic through the first switch fabric.

20. The non-transitory computer-readable medium of claim 18, where the instructions further comprise:
one or more instructions that, when executed by the at least one processor, cause the at least one processor to:
detect, after switching the first switch fabric from being the standby fabric plane to being the active fabric plane, that the second control board has been restored;
designate the second switch fabric as the active fabric plane after detecting that the second control board has been restored; and
designate the first switch fabric as the standby fabric plane after detecting that the second control board has been restored.

* * * * *